United States Patent
Bhaviripudi et al.

(10) Patent No.: US 10,504,006 B2
(45) Date of Patent: *Dec. 10, 2019

(54) CLASSIFICATION, SEARCH AND RETRIEVAL OF SEMICONDUCTOR PROCESSING METROLOGY IMAGES USING DEEP LEARNING/CONVOLUTIONAL NEURAL NETWORKS

(71) Applicant: Applied Materials, Inc., Santa Clara, CA (US)

(72) Inventors: Sreekar Bhaviripudi, Sunnyvale, CA (US); Shreekant Gayaka, San Jose, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/522,399

(22) Filed: Jul. 25, 2019

(65) Prior Publication Data

US 2019/0347527 A1 Nov. 14, 2019

Related U.S. Application Data (63) Continuation of application No. 15/635,367, filed on Jun. 28, 2017, now Pat. No. 10,387,755.

(51) Int. Cl.

| G06K 9/62 | (2006.01) |
| G06N 3/04 | (2006.01) |
| G06N 3/08 | (2006.01) |
| G06K 9/46 | (2006.01) |
| G06N 20/00 | (2019.01) |

(52) U.S. Cl.
CPC ......... *G06K 9/6267* (2013.01); *G06K 9/4628* (2013.01); *G06K 9/6256* (2013.01); *G06K 9/6271* (2013.01); *G06N 3/04* (2013.01); *G06N 3/0454* (2013.01); *G06N 3/08* (2013.01); *G06N 3/082* (2013.01); *G06N 20/00* (2019.01)

(58) Field of Classification Search
CPC .. G06K 9/4628; G06K 9/6256; G06K 9/6267; G06K 9/6271; G06N 20/00
USPC ....... 382/156, 159, 144, 145, 149, 190, 209; 700/166; 219/121.68, 121.69, 121.83; 257/E21.527
See application file for complete search history.

(56) References Cited

U.S. PATENT DOCUMENTS

| 9,816,939 B2* | 11/2017 | Duffy | G01N 21/8851 |
| 10,140,511 B2* | 11/2018 | Macciola | G06K 9/00449 |
| 10,360,477 B2* | 7/2019 | Bhaskar | G06K 9/6256 |
| 2007/0106416 A1* | 5/2007 | Griffiths | B23K 26/032 700/166 |
| 2016/0341791 A1 | 11/2016 | Duffy | |
| 2017/0200260 A1 | 7/2017 | Bhaskar et al. | |

* cited by examiner

*Primary Examiner* — Charlotte M Baker
(74) *Attorney, Agent, or Firm* — Patterson + Sheridan LLP (57) ABSTRACT

A method of classifying substrates with a metrology tool is herein disclosed. The method begins by training a deep learning framework using convolutional neural networks with a training dataset for classifying image dataset. Obtaining a new image from the meteorology tool. Running the new image through the deep learning framework to classify the new image.

20 Claims, 4 Drawing Sheets

CLASSIFICATION, SEARCH AND RETRIEVAL OF SEMICONDUCTOR PROCESSING METROLOGY IMAGES USING DEEP LEARNING/CONVOLUTIONAL NEURAL NETWORKS

CROSS-REFERENCE TO RELATED APPLICATIONS

This application is a continuation of U.S. patent application Ser. No. 15/635,357, filed Jun. 28, 2017, and is herein incorporated by reference in its entirety.

BACKGROUND

Field

Embodiments of the invention relate to a method and apparatus for inspecting thin films and multidimensional structures. More particularly, the disclosures relate to a method and apparatus for integrating metrology tools in a multi-chamber vacuum processing system and the like.

Background of the Related Art

The fabrication of microelectronics devices typically involves a complicated process sequence requiring hundreds of individual steps performed on semiconductive, dielectric and conductive substrates. Examples of these process steps include oxidation, diffusion, ion implantation, thin film deposition, cleaning, etching and lithography. As one of leading technologies, NAND scaling is driving fast transition from planar 2D to 3D devices. However, the 3D NAND technology is now encountering new challenges, such as process control, inspection and metrology. Among others, gate stack integrity is as critical as wafer quality. The immediate challenge is how to effectively and accurately measure the thickness (& critical dimensions), roughness, stress, density and defects of complex stacks & structures, such as gate multilayer complex oxide-nitride-oxide (ONO) or oxide-poly-oxide (OPO) stacks of up to a few hundred pairs.

With ever-decreasing device dimensions, the control of critical dimensions and process uniformity becomes increasingly more important. Complex multilayer stacks require precise process monitoring the critical dimensions for the thickness, roughness, stress, density, and potential defects. The critical dimensions are verified by measuring the dimensions with a metrology tool. Conventional tools using transmission electron microscopes (TEM) or scanning electron microscopes (SEM) imaging utilize destructive testing techniques, and are costly and time-consuming, making the conventional tools incapable of automation or in-line integration. Current non-destructive metrology tools in production fabs, including broadband spectroscopic ellipsometry technology among other tools such as x-ray technology tools. The purpose of the metrology tool is to provide and identify anomalies in the substrates during processing. However, the metrology tools currently do not have the throughput with acceptable accuracy, for example, the current throughput has an image classification accuracy of about 80%. The throughput accuracy slows production and potentially allows substrates out of specification to continue processing costing time and money.

Therefore, there is an ongoing need for improved metrology tool performance.

SUMMARY

A method of classifying substrates with a metrology tool is herein disclosed. The method begins by training a deep learning framework using convolutional neural networks with a training dataset for classifying image dataset. Obtaining a new image from the meteorology tool. Running the new image through the deep learning framework to classify the new image.

BRIEF DESCRIPTION OF THE DRAWINGS

A more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures. It is also contemplated that elements of one embodiment may be advantageously incorporated in other embodiments without further recitation.

DETAILED DESCRIPTION

Figure 1:
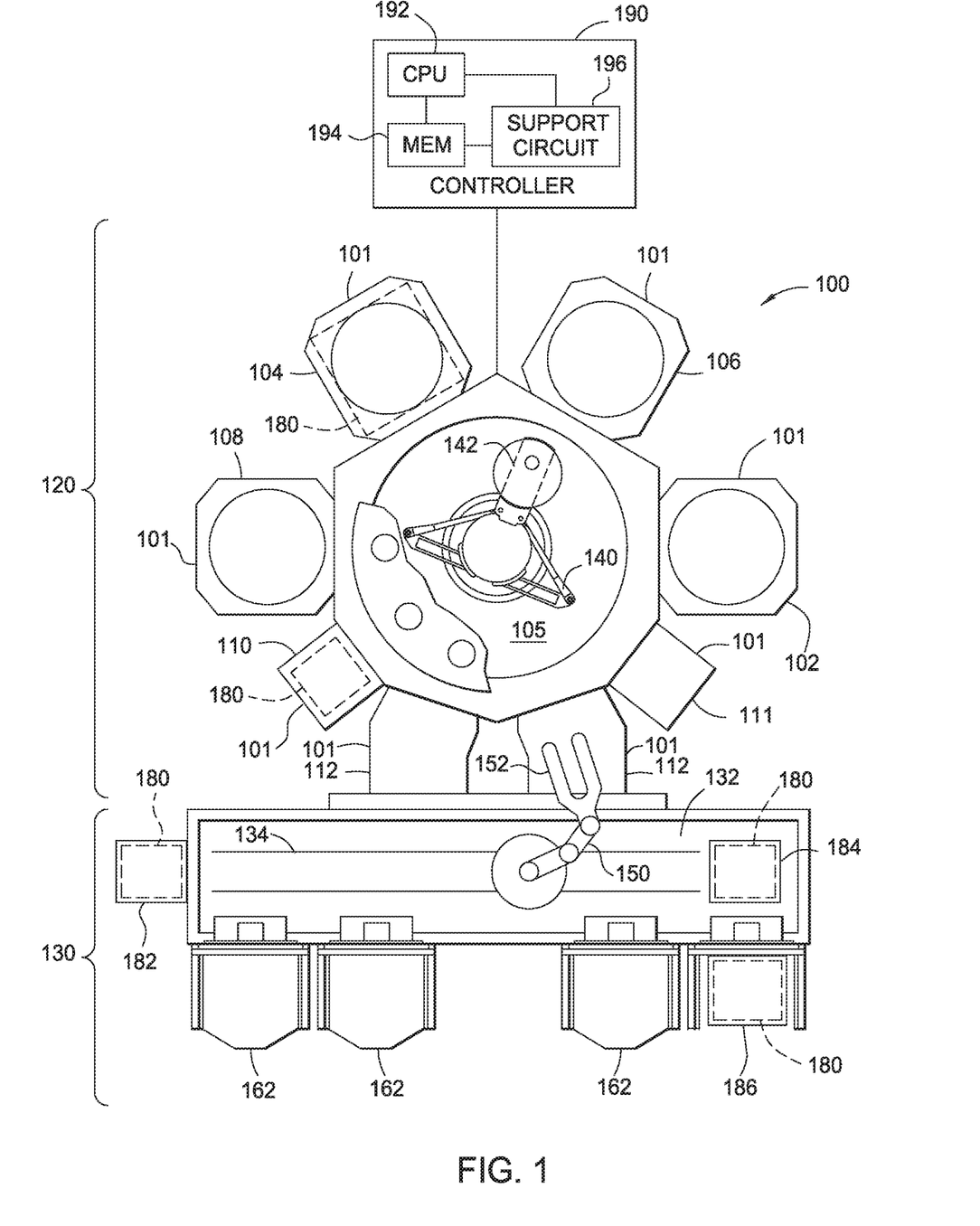
FIG. 1 is a schematic diagram showing a multi-chamber vacuum processing system having an integrated metrology chamber.

Embodiments of the present disclosure relate to a method and apparatus for a metrology tool which may stand alone or be integrated with a multi-chamber vacuum processing system, such as an in-line or cluster vacuum processing tool. By providing non-destructive metrology capabilities during processing, the process monitoring and process control can be greatly facilitated thereby resulting in fewer defects, higher yield and lower manufacturing costs. FIG. 1 is a schematic diagram showing a top view of a multi-chamber vacuum processing system 100 having an integrated non-destructive metrology tool 180. The multi-chamber vacuum processing system 100 also includes a system controller 190, a vacuum-tight processing platform 120 and a factory interface 130.

The vacuum-tight processing platform 120 has a plurality of attached chambers 101 disposed around a transfer chamber 105. The transfer chamber 105 is coupled to a vacuum system (not shown) for providing a reduced atmosphere condition in the vacuum-tight processing platform 120. The transfer chamber 105 houses a robot 140. The robot 140 has a retractable blade 142 configured to support a substrate. The robot 140 has a range of motion operable to transfer substrates disposed on the retractable blade 142 to and from the attached chambers 101.

One of the attached chambers 101, such as chamber 112, may be a load lock chamber. Another one of the attached chambers 101, such as process chamber 108, may be an etch chamber. Some of the attached chambers 101 may be a deposition chambers. The deposition chambers may include one of a chemical vapor deposition 102, a physical vapor deposition chamber 106, and an atomic layer deposition chamber 104. Additionally, one of the attached chambers 101, such as process chamber 110 or process chamber 111, may be a metrology chamber, orientation chamber, de-gas chamber or other suitable chamber.

The process chamber 110, when configured as a metrology chamber, is operatively coupled to the metrology tool 180. The metrology tool 180 which performs measurements on a substrate disposed inside the process chamber 110. The metrology tool 180 may be a multi-function X-ray metrology tool used to perform measurements on a substrate that has been, or is to be, processed in one or more of the process chambers 101, as shown as phantom in deposition chamber 104. Information regarding substrate characteristics can be extracted from the measurements obtained by the metrology tool 180, and decisions can be made as to whether additional processing may be needed for that substrate, or whether the process conditions in the process chamber 108 should be adjusted to improve yield.

The factory interface (FI) 130 may have a plurality of front opening universal pods (FOUPs) 162 and a FI robot 150. The FI 130 may also have a chamber or station suitable for housing the metrology tool 180. For example, the metrology tool 180 may be located at a station 182 attached to an end of the FI 130, a station 184 disposed on an interior surface 132 of the FI 130, or a station 186 in place of one of the FOUPs 162.

The FI robot 150 may have rails 134 and a moveable blade 152. The FI robot 150 is configured to have a range of motion sufficient to transfer substrates the moveable blade 152 between the FOUPs 162, the metrology tool 180 if present in the FI 130, and the load lock chambers.

The system controller 190 is coupled to and controls each chamber or module of the multi-chamber vacuum processing system 100. Generally, the system controller 190 may control all aspects of operation of the processing system 100 using a direct control of chambers and apparatus of the processing system 100 or, alternatively, by controlling the computers associated with these chambers and apparatus. Furthermore, the system controller 190 may also be configured to communicate with a control unit associated with the metrology tool 180. For example, movements of the robot 140, transferring substrates to and from the process chambers 102, 104 and 106 and the metrology chamber 110, performing process sequences, coordinating operations of the metrology tool 180 with various components of the multi-chamber vacuum processing system 100, and so on, may be controlled by the system controller 190.

In operation, the system controller 190 enables feedback from the respective chambers and apparatus to optimize substrate throughput. The system controller 190 comprises a central processing unit (CPU) 192, a memory 194, and a support circuit 196. The CPU 192 may be one of any form of a general purpose computer processor that can be used in an industrial setting. The support circuit 196 is conventionally coupled to the CPU 192 and may comprise cache, clock circuits, input/output subsystems, power supplies, and the like. The software routines, when executed by the CPU 192, transform the CPU into a specific purpose computer (controller) 190. The software routines may also be stored and/or executed by a second controller (not shown) that is located remotely from the multi-chamber vacuum processing system 100, such as at the metrology tool 180.

Although the metrology tool 180 is discussed in relation to the process chambers 101 throughout this discussion, the metrology tool 180 may be integrated with other chambers 101 or the FI 130. For example, the metrology tool 180 may work to provide in-situ measurements integrated with process monitoring and control in the process chambers 101, e.g., the chemical vapor deposition 102 used to deposit material on the substrate or the etch chamber 108 used for etching. Additionally, the metrology tool 180 may be provided as a standalone system unattached and remote from the processing system 100, but communicating with the processing system 100 to provide information utilized for process monitoring and control within the chambers 101 or elsewhere within the processing system 100.

Semiconductor processing involves fabrication of exquisitely patterned nanoscale structures that in several cases are controlled to either a width or depth involving just few atoms. The patterned geometric features typically seen in scanning electron microscopy (SEM) images and transmission electron microscopy (TEM), i.e., metrology tool 180, include lines, straight edges that make it amenable to application of deep learning technique, which are efficient in calculating spatial statistics.

Figure 2:
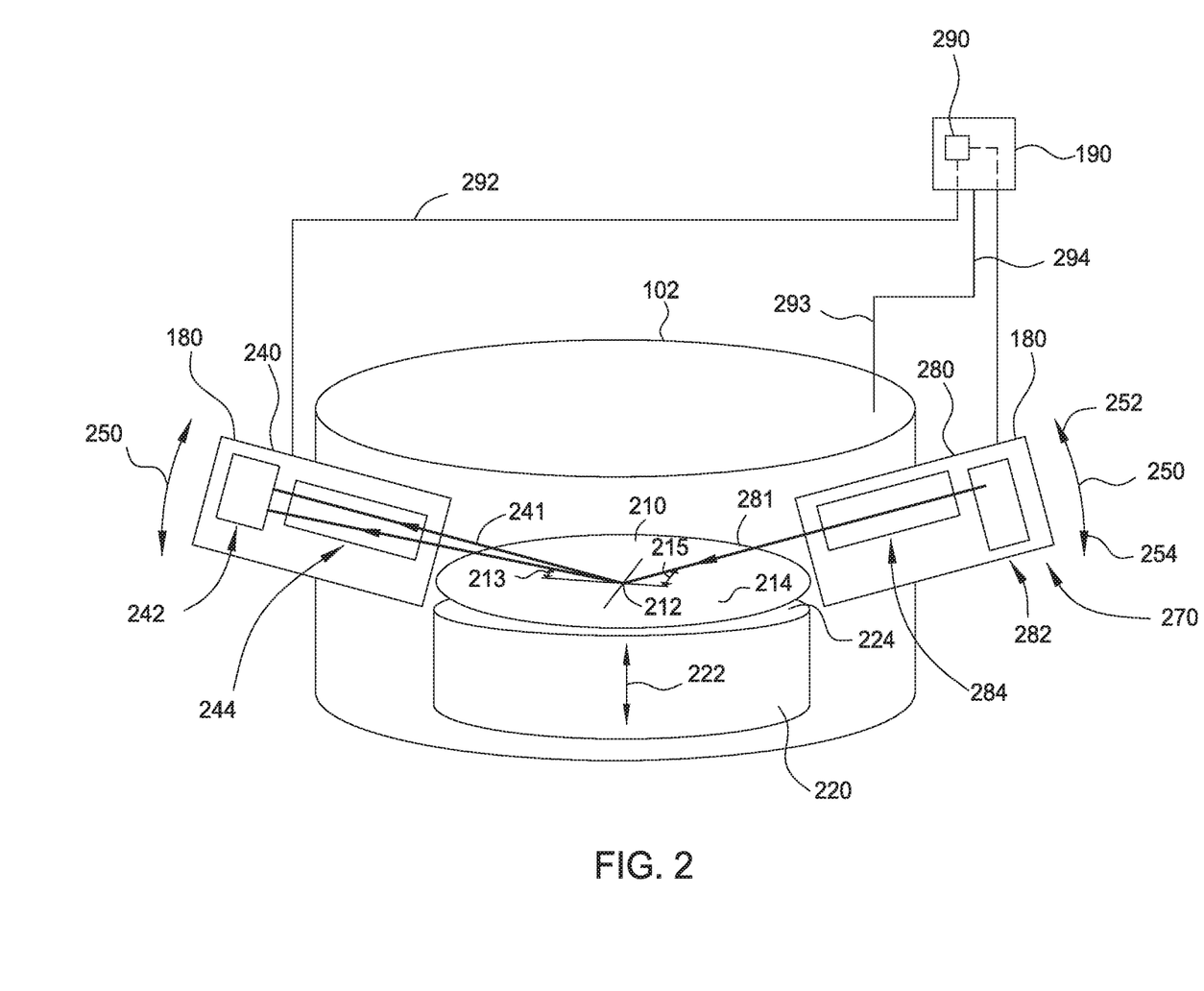
FIG. 2 is a schematic for a metrology tool suitable for use with the multi-chamber vacuum processing system.

FIG. 2 is a schematic for the metrology tool 180 suitable for use with the multi-chamber vacuum processing system 100. The following discussion of FIG. 2 is provided with respect to the metrology tool 180 configured to measure a substrate 210 after processing in the CVD chamber 102. It should be appreciated that the metrology tool may be located in any chamber 101 of the vacuum-tight processing platform 120 and/or attached to the factory interface 130 of the processing system 100, as well as a standalone system.

The metrology tool 180 is well suited for in-situ measurement as it uses non-destructive X-ray metrology which is capable of probing to the nanoscale level and characterizes various materials, i.e., powders, thin films and bulk materials, crystalline and amorphous, optically opaque, organic or liquid samples, without calibration curves, or reference samples. The sampling depth may be greater that about 2 nm. For example, the X-ray sampling depth can range from about 2 nm to about 10 nm and is extendable to about 30 um. The metrology tool 180 may probe rough (greater than about 2 nm) or discontinuous interfaces/surfaces and at angles above about 0.1 degrees to about 0.5 degrees even at depths exceeding 1 um.

The metrology tool 180 has a substrate support 220. The substrate support 220 has a top surface 214 configured to support the substrate 210 thereon. The substrate support 220 may be configured to move in a vertical direction as shown by arrow 222. The metrology tool 180 may be controlled by the system controller 190 through an input/output connection 293. The system controller 190 may provide instructions for the substrate support 220 to move up or down in the vertical direction as well as instructing the metrology tool 180 on processes performed therein.

The metrology tool 180 has a software module 290, a transmitting module 280 and a receiving module 240. The hardware design of the transmitting module 280 and receiving module 240 coupled with the software module 290 can enable the full automated control of X-ray source, optics, detector, goniometer, sample stage (wafer loading, mapping, etc.) and fast switching between the sub-modules required for each technique, for production fabrication applications.

The metrology tool 180 has a multi-function X-ray for measuring the parameters for various CD on the substrate 210 for production inspection/monitoring of complex stacks & structures. The metrology tool 180 may also include three function modules: the x-ray metrology module 270, the software module 290 and the front end module for controlling automation integration (substrate load/unload, etc.).

The X-ray metrology module 270, may use both primary and complementary techniques for obtaining CD measurement data. The primary techniques may include one of small-angle X-ray diffraction (SAXRD) and small-angle X-ray scattering (SAXS). The small angle x-ray diffraction (SAXRD) and small angle x-ray scattering (SAXS) techniques can be applied to inspect in-line or off-line substrates.

In one embodiment, the metrology tool 180 uses SAXRD's capability of measuring one dimension (1D) periodic multilayers for inspecting substrates. The SAXRD technique may measure the modulation periods for periodic multilayers (such as ONO, OPO stacks) or "super-lattices", i.e., a periodic structure of layers of two (or more) materials, which may range from about 1 nm to about 100 nm. The SAXRD technique may measure individual layer thickness for $SiO_2$ and $Si_3N_4$ in ONO, and $SiO_2$ and poly-Si in OPO. The SAXRD technique measures the diffraction peaks from these synthetic nanostructures at very low angles, such as less than about 3 degrees. SAXRD technique can measure a wide variety of materials, ultrathin (~10 nm) to very thick (several to tens of microns), crystalline or amorphous, semiconductor, metal, dielectric, magnetic or organic. The SAXRD technique detects individual layer's thickness' drift and film/interface roughness and density. Thus, SAXRD may be used to determine how much the top or bottom layer is drifting from each other and the overall process.

The metrology tool 180 may use SAXS for inspecting 3D nano-structures (or 3D "super-lattices") for devices formed after ONO or OPO stack depositions. SAXS is related to the shape and size of nanostructures and the distances of ordered features, i.e., the distance between individual nanostructures. The measurable sizes or dimensions range from about less than 1 nm to about 25 nm, and up to about 200 nm for repeating structures. The SAXS is capable of measuring along all three axis to determine the CD of 3D NAND nanostructures. This makes SAXS well suitable to inspect 3D NAND nanostructures. The SAXS techniques may be used for post etch inspection for detecting the via size, via spacing distribution, via fill with poly-Si, post trench open inspection, and post W-gate electrode deposition inspection. The SAXS technique may also be used to inspect 3D nano-structures (3D "supper lattice"), comprised of various materials, such as metallic, dielectric, magnetic, crystalline, amorphous, optically opaque, organics and/or liquids.

The secondary techniques include at least one or more of grazing incidence X-ray diffraction (GI-XRD), X-ray reflectivity (XRR), and high resolution X-ray diffraction (HR-XRD). The X-ray metrology module 270 is capable of switching between the primary and the secondary techniques to select the technique best suited for measured results.

The secondary techniques are complimentary to the primary techniques and provide for a broad variety of testing and monitoring. For example GI-XRD, XRR, HR-XRD may be useful for single-crystal & epitaxial layer structures to investigate crystallinity, strain/stress, thickness, composition and density. Additionally, XRF, GI-XRF provides information for determining composition, metal contamination, and defect inspection/analysis. The XRD techniques provide information indicative of crystallography, phase, strain/stress, and texture analysis. In some embodiments, these complimentary techniques are formed using the same X-ray source, the sample stage with SAXRD/SAXS, combined with additional optics and detector sets (or sub-modules, one for each technique), and with additional software functions. This could add techniques selected by users with reasonable costs to the basic tool with the primary techniques.

The transmitting module 280 has an x-ray source 282, i.e. x-ray generator tube, and x-ray optics 284. The x-ray source 282 generates an incident ray 281 that strikes a top surface 214 of the substrate 210. The angle between the incident ray 281 and the top surface 214 is the incidence angle 216 which may be adjusted as shown by arrow 250.

The receiving module 240 has an x-ray optics 244 and a detector 242. The x-ray optics 244 collects the diffracted, scattered and fluoresced rays 241. The rays 241 may propagate from the top surface 214 of the substrate 210 at a diffracted angle 213. The diffracted angle 213 may be the same or different than the incidence angle 216.

The x-ray optics 284, 244 may be configured for one or more x-ray metrology methods. For example, the x-ray optics 284,244 may be configured for SA-XRD, SAXS, among other techniques. The metrology tool 180 may use the same x-ray source 282 and different x-ray optics 284, 244 to switch between one technique to another, such as switching between SA-XRD and SAXS. The internal optics of the x-ray optics 244 may have optional optics which may be switched, replaced, rotated automatically or moved to operate with SA-XRD, SAXS or other suitable techniques for measuring 3D NAND features. Additionally, the x-ray source 282 may include one or more mechanisms for providing different x-ray sources suitable for switching between SA-XRD, SAXS, among other techniques.

The software module 290 may be coupled to CPU suitable for running software instructions and a storage device, such as a database, hard drive, memory, cloud, or other locations suitable for storing data and program instructions. The software module 290 may control the operation of the metrology tool 180, e.g., implementing metrology measurements, acquiring and storing data, analyzing results, and so on. The software module 290 may be configured to communicate with the system controller 190 for allowing various operations to be performed in a coordinated fashion. In one embodiment, the software module 290 is integrated into the system controller 190. Alternately, the software module 290 may be configured as a standalone terminal or other suitable device for controlling the metrology tool 180 and storing or transmitting data captured by the metrology tool 180.

The software module 290 may be a control module which provides automation and control of hardware functions, such as control of the transmitting module 280 and receiving module 240. For example, the control module may provide mechanical/optical alignment of the transmitting module 280 and receiving module 240. The control module positions the transmitting module 280 and receiving module 240 for scanning and mapping the substrate 210 surface.

The software module 290 has program code which may control the x-ray optics 284 to adjust the incidence angle 216 for the incident ray 281. The larger the incidence angle 216, the deeper the penetration of the X-ray into the substrate 210 for measuring structures therein. A vertical profile may be accurately obtained for the structure by adjusting the incident angle accordingly.

The software module 290 may include sub-modules configured for X-ray metrology data acquisition, analysis (simulation) and reporting (DAR) module. The metrology tool 180 may measure substrate critical dimensions (CD). The software module 290 may collect the data from the receiving module 240 and use the collected data to determine the characteristics of the substrate at each location along the surface of the substrate. A model for SAXRD data analysis/simulation is provided to enable accurate multilayer measurement for device manufacturing. The model may include parameter (thickness, roughness, density, etc.) variations along the surface of the substrate. The model enables the SAXRD to detect if any layer parameter drifts by classifying the x-ray images provided by the metrology tool.

The software module 290 may have a deep learning framework using convolutional neural networks. The deep learning framework is applied to the metrology image classification, image search and image retrieval. A substantially higher multiclass classification accuracy of 98% is achieved using the deep learning framework compared to conventional methods (~80%).

A training dataset is used to train the deep learning framework for classifying the images of the substrate. The training dataset may provide supervised learning for classifying the images. That is, the training dataset provides images having examples of features which are classified. After the deep leaning framework (framework) is trained, future images are classified based on what the framework learned about the classification from the training dataset classification metrics. After the deep learning framework is trained, classification metrics on a test dataset have demonstrated a precision of greater than 91%, recall greater than 81% and a F1-score (measure of a test's accuracy) greater than 94%. Additionally, an extremely efficient technique for the search and retrieval of substrate images can be demonstrated using the application of both convolutional deep neural nets and the KNN (K nearest neighbor) algorithm, which yields far superior results compared to existing methods that rely on comparison of images on a pixel by pixel basis. In this manner, decision boundaries assist in the classification of the images.

Deep learning framework is a subset of machine learning methods that are based on learning representations in data. The word 'deep' refers to layered/hierarchical learning. A fundamental building block of a deep learning neural network is a perceptron. The perceptron is an algorithm for supervised learning of binary classifiers that is composed of a linear component (weighted-sum of inputs) and a non-linear-component (activation). Combining perceptrons in multiple layers enables representation of complex features for addressing a multitude of real-world problems and discrepancies from substrate to substrate.

In a convolutional deep neural network with multiple layers, the first layer recognizes the edges of the substrate. The output from the first layers is fed into intermediate layers that identify corners/contours. The intermediate layers are fed into the final layers identifying semiconductor features such as structures and defects. One of the many advantages of deep learning includes automatic extraction of features for the classification problem at hand as opposed to engineering hand-crafted features. Another advantage of deep learning is the ability to perform transfer learning, i.e., once the model has been trained on a large dataset, we do not need to train it from scratch for a new dataset from a different tool or measurement equipment.

Figure 3:
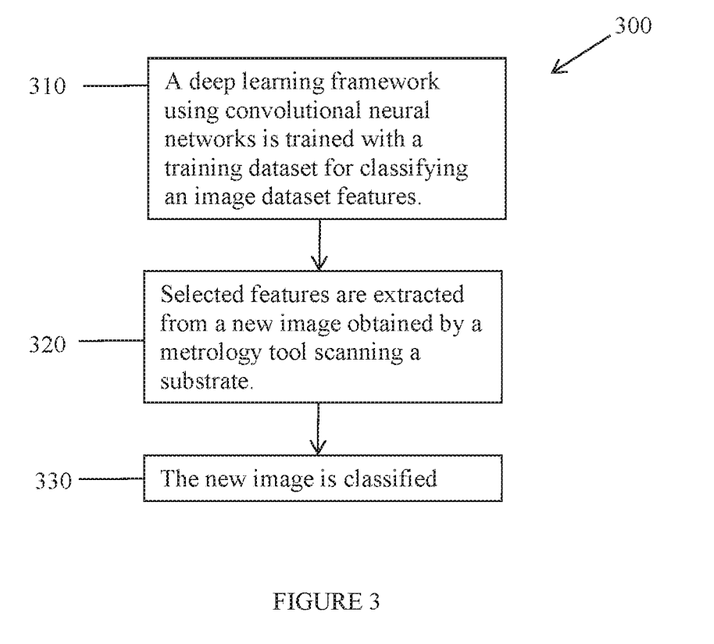
FIGS. 3 and 4 are methods for production inspection of a multidimensional structure.
Figure 4:
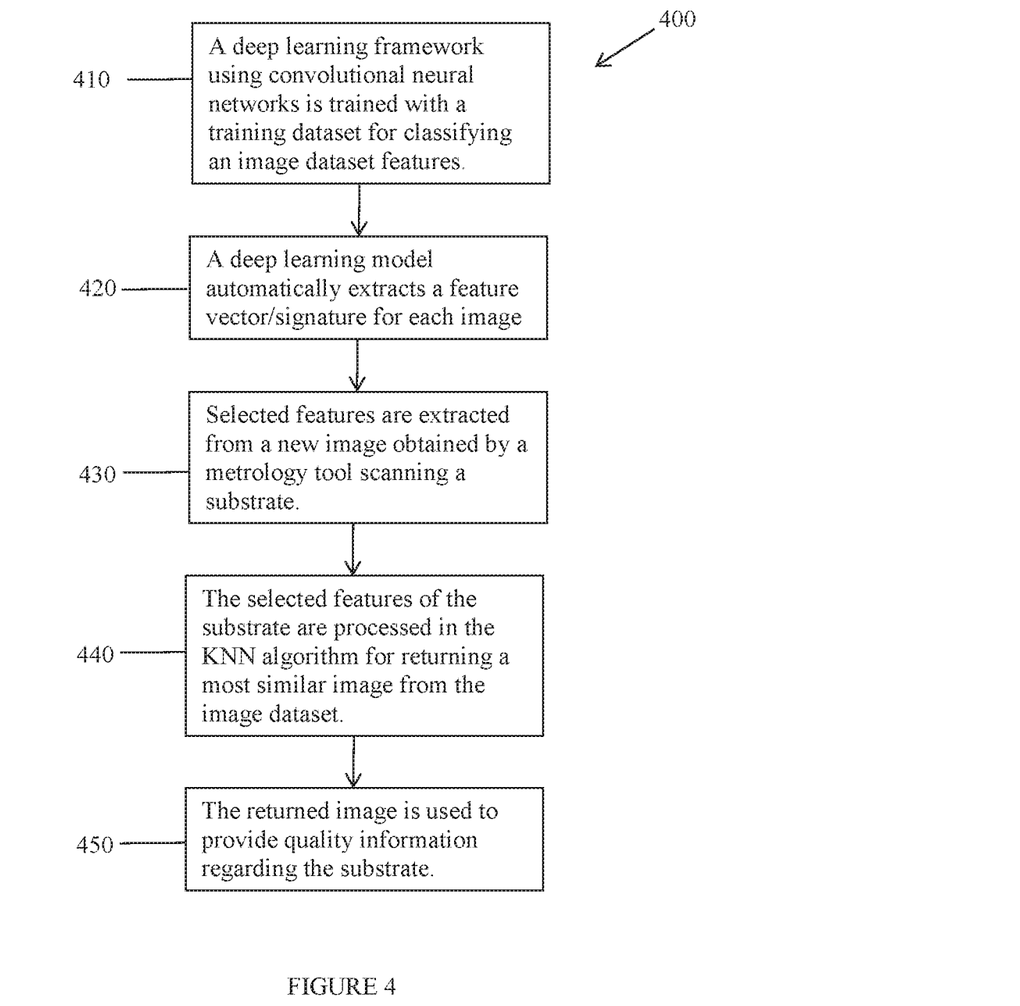

FIGS. 3 and 4 are methods for production inspection of a multidimensional structure. The method classifies substrate images for search and retrieval using convolutional deep neural networks. The images are of a substrate scanned on a metrology tool which may be attached to a factory interface, multi chamber vacuum processing system, standalone tool, or other apparatus in a semiconductor fabrication environment. The images depict high resolution features on the substrate surface for identifying defects and performing quality control in semiconductor manufacturing. The substrate is placed on metrology tool for scanning the substrate and generating the images. The metrology tool has software disposed therein which interfaces with the camera, microscope, x-ray or other suitable sensor to classify the substrate.

The metrology image classification, search and retrieval method is broken down to a first section and a second section. A first section method is illustrated in FIG. 3. The first section method predicts or evaluates the quality of the substrate based on metrology images. The prediction and evaluation is performed using deep convolutional neural net modeling to classify defects in or on the substrate. A second section method is illustrated in FIG. 4. The second section method identifies root causes for the classified defects, or diagnoses them, based on searching a database of metrology images using deep convolutional neural net model along with KNN for fast search. It should be appreciated that the methods of FIGS. 3 and 4 may be performed independently or in concert. Thus, substrate defects can be mitigated instead of merely being identified.

The metrology tool utilizes software to classify the substrate images and make a determination of the suitability of the substrate to continue processing in general. In a first block 310, a deep learning framework using convolutional neural networks is trained with a training dataset for classifying an image dataset. A dataset of images is split into a training dataset and a working dataset of images. The training dataset is categorized. Images containing defects are marked as are images having acceptable variations and those which are free of defects. The defects may be further characterized at each image segment or locals which will be subject to further examination and scrutiny during actual operation of the metrology tool. The software has several convolutional deep neural nets, whose architectures are similar to the ones aforementioned, and trained with a training dataset of images. Multiple features are extracted from the images to provide layers for classification. The classification may include a number of categories corresponding to defects, acceptable, skewed, contamination, or other quality issue. The fewer categories the quicker the operations however, the more limited the notifications can be. In one embodiment, the classifications are broken down to 6 categories based on the structure on incoming wafers: 2× NAND STI, XPoint, 3DNAND-Side, 3DNAND-Top, 3DNAND-Angle and 3× DRAM STI describing features on the substrate.

The features may be image segments having topology of concern. A filter may determine the size and location of the image segment. For example, the substrates may have plurality of dies with each die having a plurality of features. The topology of one feature corresponding to one die location may be in a first image segment classified in the image dataset. Thus, the classification of a single image may have multiple layers corresponding to the plurality of image segments. In one embodiment, a single training dataset is directed to the plurality of features for training the neural network. In another embodiment, a plurality of training dataset are used for classifying the images wherein the plurality of training datasets are directed at the level of a single feature used in a single layer of extraction or image segment.

In one embodiment, a collection of more than 1000 SEM images from various semiconductor processing applications were classified into 6 different categories. The images were labeled and divided into a training dataset with 750 images with the remaining images going into a test dataset. A convolutional deep neural network (CNN) architecture was built and trained on the training set images. Performance on test data set was evaluated. The CNN architecture includes several convolution-pooling layers. The output from these intermediate layers are flattened to extract features and then fed into a feed-forward neural network for classification. To generalize the neural net models for classification that were built on the training set images, dropout technique was utilized.

In a second block 320, selected features are extracted from a new image obtained by a metrology tool scanning a substrate. The new image may provide a whole image of the substrate or image segments for preselected areas of the substrate. In yet another alternative, the image may be broken down to segmented areas for uniquely providing attributes to the segmented areas. In this manner, one segmented area of the totality can be identified with quality issued while allowing the remaining segmented areas to continue processing. The identified segmented area may be marked for subsequent processing to bring it into conformity or may be marked as reject is the defect is extreme.

In a third block 330, the new image is classified. The new image is scanned, post-semiconductor processing, and the classification is made by the trained deep learning model. The new image is classified with inference on the type of defect, structure, etc. associated therewith. The classification of the new image provides information on the quality of substrate. Depending on the classification, the substrate may be pulled aside for further analysis or may be allowed to continue with further processing.

The substrates pulled aside for further analysis may have the method of the section shown in FIG. 4 preformed thereon. The method provides the identify of root causes for the defect. Furthermore, a diagnosis for the defect may be obtained through searching a database of metrology images (using deep convolutional neural net model along with KNN for fast search). In a first block 410, a deep learning framework using convolutional neural networks is trained with a training dataset for classifying an image dataset. In one embodiment, the deep learning framework is the same deep learning framework performing the method of FIG. 3 discussed above. In another embodiment, the deep learning framework is proposed for uniquely performing the operations of method 400 alone. In the scenario wherein the deep learning framework of method 300 and 400 are not the same framework, one skilled in the art should appreciate the similarities of the two deep learning frameworks while also appreciating the differences in the training provided to the two frameworks and thus the results.

In a second block 420, a deep learning model automatically extracts a feature vector/signature for each image. The vector is much smaller in size compared to the entire image, yet provides the areas of concern. The image dataset is run through a K nearest neighbor (KNN) algorithm to provide decision for each of the selected features and image segments. The operation provides a multivariate or multidimensional KNN function wherein the extracted features of all the images in the database are classified. A combination of convolution, pooling and dropout operations is applied to the process output. The process output is then flattened and stored in a database for fast searching and retrieval based on the image segments. A lower dimensional space for the images is thus needed with all extraneous information removed, leaving only the extracted searchable features of each image.

In a third block 430, selected features are extracted from a new image obtained by a metrology tool operating on a substrate. The features are extracted to search images in the data base that are similar to the new image. Feature vectors for the new image are extracted using the training model. The new image has the same convolution, pooling and dropout operations applied to the new image for extracting the image segments. The image segments are now ready for determining the suitability or quality for the features provided in each of the image segments.

In a fourth bock 440, the selected features of the substrate are processed in the KNN algorithm for returning a most similar image from the image dataset. The KNN algorithm is implemented on the extracted features of the new image. The feature vectors of the new image are compared to the feature vectors of all images in the database using the KNN algorithm and matches to the feature vectors/images are returned. The extracted features of the image are searched against the dataset for similar features. For example, the top five feature vectors matches may be returned. Metadata may be provided with the image and the feature is classified in the metadata similar to the image having a feature within the same boundary conditions. The result provides a KNN solution from which the new image defects can be analyzed. The most similar images from the KNN algorithm are used to return the actual images and determine discrepancies on the substrate.

Alternately, the algorithm may be run at the feature level for determining defects, or freedom therefrom, at each feature. In this manner, each feature or image segment is classified. The plurality of classifications now associated with the single substrate provides information for classifying each die or image segment which may be carried forward with the substrate throughout the manufacturing process. For example, the classification may provide that of 400 dies on a substrate, dies located in certain areas, such as dies 40-50, may be out of specification. This can lead to further operations directed to these locations or the tagging these locations as defective.

In further operations in a fifth bock 450, the returned image is used to provide quality information regarding the substrate. The return image metadata is tagged to the substrate which follows the substrate throughout fabrication. The quality information may concern overall quality of the substrate. For example, by reviewing the database with the processing conditions/anomalies for the returned images, for example 5 images, a root cause can be identified or diagnosis, and a solution may be provided for corrected the defect or preventing future defects on subsequent substrates. Alternately, the quality information may be directed to individual areas of the substrate. Thus, the method may be further extended to provide notifications regarding the classification of the substrate from the images. The notification may be provided to processing equipment, users, metadata attached to the substrate or other suitable locations. The notifications may be an alarm, an electronic message such as text or email, to a user, control panel or database. The notification contains instructions as to the status of individual locations of the substrate. The notifications may contain information useful for further processing of the substrate. The notifications may also contain instructions which may be run on factory equipment to effect processing of the substrate or subsequent substrates. For example, the notification may contain information which directs process parameter changes for a next substrate, a process recipe change for subsequent process for the current substrate, etc. Thus, the notification may provide modifications to operations in the factory equipment such as ashing, polishing, etching or deposition processing for the current substrate or subsequent substrates. The notification may direct a robot to remove the substrate from fabrication. The notice may provide information regarding process creep leading to modification of process parameters or preventative maintenance of equipment. For example, the notification may schedule a preventative maintenance event or adjust the schedule of future preventative maintenance events.

In one embodiment, a status of the substrate is determined to be acceptable or rejected based on the image classification. A notification may be provided to the operator or equipment regarding the status of the substrate. In another embodiment, the classification determines adjustment to operating parameters for controlling the production process. For example, a temperature may be adjusted on processing equipment based on results of the results of the classification of the substrate image from the metrology tool. Alternately, the metrology tool may send a production halt on the processing equipment based on a classification of several images from eth metrology tool indicating unacceptable output.

Irrespective of the complexity of the convolution deep neural net, we achieved a significantly higher classification accuracy (>94% using the simplest convoluted neural network (CNN) architecture and 98.5% using a several layer CNN) compared to traditional methods that are based on hand-crafted features. Interestingly, the classification accuracy was high even when we converted large SEM images (1296×1080) into thumbnail images (32×32) and applied the CNNs for classification. Finally, these methods are unequivocally applicable to wafer defect maps, thin film metrology maps and NOVA measurement wafer maps. In addition to classification, a search and retrieval functionality, i.e., given an image, may return search results from the database of images that are most similar to it. The search results from our techniques are far superior to existing methods. Most image search methods that are currently used in the semiconductor processing industry rely upon (1) on simple visual inspection and (2) the application of k-nearest neighbors' algorithm to pairwise pixels between two images (and or a similar technique). Search results from either of these methods are not highly accurate, specifically in the latter case, KNN algorithm fails to account for translational invariance of the features in the images amongst other drawbacks. Overall, an extremely efficient technique is demonstrated for the search and retrieval of semiconductor processing images using the application of both convolutional deep neural nets and the KNN algorithm, which yields far superior results compared to existing methods that rely on comparison of images on a pixel by pixel basis.

The lower level feature extractors (the initial layers on the data input side) do not change significantly from one dataset to another, and thus fine-tuning only the higher level layers with a smaller dataset is sufficient for the model to achieve similar performance level. This is in stark contrast to traditional approaches, where even a small change in the data set can warrant extracting new features or increased misclassification rates. The type of features extracted by any layer may be probed by use of a filter visualization method. Examining the weights of the lower layers clearly indicate that they mostly learn very simple visual patterns such as straight edges and color blobs, and remain fairly invariant across various datasets. The higher level features compose these simple patterns to create the geometric patterns observed in SEM images. To summarize, deep learning methods allow end-to-end training and scalability, while significantly improving accuracy and generalizability of the models.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized for storing a program product which, when executed, is configured to perform method for classifying substrates with a metrology tool. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, radio, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, SMALLTALK™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access software routines (e.g., a method for classifying substrates with a metrology tool) or related data available in the cloud. For example, the software routines could execute on a computing system in the cloud. In such a case, the software routines could maintain spatial and non-spatial data at a storage location in the cloud. Doing so allows a user to access this information from any computing system attached to a network connected to the cloud (e.g., the Internet).

Embodiments of the disclosure have been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

While the foregoing is directed to the preferred embodiment of the present invention, other and further embodiments of the invention may be devised without departing from the basic scope thereof, and the scope thereof is determined by the claims that follow.

What is claimed is:

1. A method of classifying substrates with a metrology tool comprising:
   providing a machine learning model trained to classify features in images, the machine learning model trained with a first training image data set;
   processing a new image obtained from a substrate with the metrology tool, by extracting a new image feature using the machine learning model;
   classifying the new image feature using a classification algorithm, such that a matching image from the first training image data set is returned that contains a matching feature that resembles the new image feature; and
   determining, from the matching image, quality information regarding the substrate.

2. The method of claim 1 wherein the machine learning model is a deep learning model.

3. The method of claim 2 wherein the deep learning model is a convolutional neural network.

4. The method of claim 1 wherein the classification algorithm is a K Nearest Neighbor (KNN) algorithm.

5. The method of claim 1 wherein determining from the matching image, quality information regarding the substrate further comprises extracting metadata from the matching image and tagging the metadata to the substrate.

6. The method of claim 1 further comprising:
   providing a second machine learning model trained to classify features in images, the second machine learning model trained with a second training image data set;
   processing the new image with the metrology tool, extracting the new image feature using the second machine learning model;
   classifying the new image feature using a second classification algorithm, based upon an attribute of the new image feature.

7. The method of claim 6 wherein the attribute of the new image feature comprises one of a defect and a substrate structure.

8. The method of claim 6 wherein the second training image data set is the same as the first training image data set.

9. The method of claim 1 wherein the quality information is used to identify a root cause associated with the quality information.

10. The method of claim 1 wherein the quality information is used to generate notifications to one of a substrate, processing equipment, a user, or metadata attached to a substrate.

11. A non-transitory computer-readable medium comprising instructions that, when executed by a processor of a processing system, cause the processing system to perform a method of classifying substrates with a metrology tool, the method comprising:
   providing a machine learning model trained to classify features in images, the machine learning model trained with a first training image data set;
   processing a new image obtained from a substrate with the metrology tool, by extracting a new image feature using the machine learning model;
   classifying the new image feature using a classification algorithm, such that a matching image from the first training image data set is returned that contains a matching feature that resembles the new image feature; and
   determining, from the matching image, quality information regarding the substrate.

12. The non-transitory computer-readable medium of claim 10 wherein the machine model is a deep learning model.

13. The non-transitory computer-readable medium of claim 12 wherein the deep learning model is a convolutional neural network.

14. The non-transitory computer-readable medium of claim 11 wherein the classification algorithm is a K Nearest Neighbor (KNN) algorithm.

15. The non-transitory computer-readable medium of claim 11 wherein determining from the matching image, quality information regarding the substrate further comprises extracting metadata from the matching image and tagging the metadata to the substrate.

16. The non-transitory computer-readable medium of claim 11 further comprising instructions comprising:
   providing a second machine learning model trained to classify features in images, the second machine learning model trained with a second training image data set;

processing the new image with the metrology tool, extracting the new image feature using the second machine learning model;

classifying the new image feature using a second classification algorithm, based upon an attribute of the new image feature.

17. The non-transitory computer-readable medium of claim 16 wherein the attribute of the new image feature comprises one of a defect and a substrate structure.

18. The non-transitory computer-readable medium of claim 16 wherein the second training image data set is the same as the first training image data set.

19. The non-transitory computer-readable medium of claim 11 wherein the quality information is used to identify a root cause associated with the quality information.

20. The non-transitory computer-readable medium of claim 11 wherein the quality information is used to generate notifications to one of a substrate, processing equipment, a user, or metadata attached to a substrate.

* * * * *